(12) United States Patent
Sanchirico et al.

(10) Patent No.: US 11,443,221 B2
(45) Date of Patent: Sep. 13, 2022

(54) DISTRIBUTED INCORRUPTIBLE ACCORDANT MANAGEMENT OF NONLOCAL DATA FUSION, UNIFIED SCHEDULING AND ENGAGE-ABILITY

(71) Applicant: Lockheed Martin Corporation, Bethesda, MD (US)

(72) Inventors: Mauro Joseph Sanchirico, Marlton, NJ (US); Ryan Ceresani, Bordentown, NJ (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 556 days.

(21) Appl. No.: 16/523,792

(22) Filed: Jul. 26, 2019

(65) Prior Publication Data
US 2021/0027186 A1    Jan. 28, 2021

(51) Int. Cl.
| G06F 3/01 | (2006.01) |
| G06N 7/00 | (2006.01) |
| G06K 9/62 | (2022.01) |
| H04L 9/06 | (2006.01) |
| H04L 9/00 | (2022.01) |

(52) U.S. Cl.
CPC ............ *G06N 7/005* (2013.01); *G06K 9/6288* (2013.01); *H04L 9/0643* (2013.01); *H04L 9/50* (2022.05)

(58) Field of Classification Search
CPC ........ G06N 7/005; G06N 20/00; G06N 5/003; G06K 9/6288; H04L 9/0643; H04L 2209/38; H04L 2463/121; H04L 63/123; H04L 9/3239; H04W 4/70; H04W 12/009
See application file for complete search history.

(56) References Cited

U.S. PATENT DOCUMENTS

| 2019/0058595 A1* | 2/2019 | Hamasni | G06Q 20/401 |
| 2019/0163912 A1* | 5/2019 | Kumar | G06F 16/1834 |
| 2020/0186458 A1* | 6/2020 | Farag | H04L 45/04 |
| 2020/0394183 A1* | 12/2020 | Jois | H04L 9/3239 |
| 2021/0021424 A1* | 1/2021 | Punal | H04L 9/3236 |

OTHER PUBLICATIONS

Lanny Z.N. Yuan et al. "AME Blockchain: An Architecture Design for Closed-Loop Fluid Economy Token System" (Year: 2018).*
(Continued)

*Primary Examiner* — Timothy A Mudrick
*Assistant Examiner* — Abdou K Seye
(74) *Attorney, Agent, or Firm* — Foley & Lardner LLP

(57) ABSTRACT

A system and method that uses scheduling problems as proof of work in a blockchain system, and that evaluate schedules based on a physics model and a timeline. The system and method can maintain a secured chain of linked messages that include object states and schedule portions. Processing circuitry can receive a message related to an updated state of an object, determine whether the updated state of the object should be linked into the secured chain of linked messages, determine a portion of a schedule for addressing the object based on the updated state of the object as proof of work, create a new message that links the updated state of the object into the secured chain to form an updated chain of linked object state messages and that includes the determined portion of the schedule, and broadcast the new message as the secured chain of linked messages.

16 Claims, 13 Drawing Sheets

(56) References Cited

OTHER PUBLICATIONS

Edward L. Waltz et al. "Data Fusion and Decision Support for Command and Control" (Year: 2018).*
Iansiti, M., et al., "The Truth About Blockchain", Harvard Business Review, Jan. 18, 2017, 15 pages.
Intel, "New Instructions Supporting the Secure Hash Algorithm on Intel? Architecture Processors", Jul. 2013, <https://software.intel.com/en-us/articles/intel-sha-extensions>, 23 pages.
Barnas, Neil B., "Blockchains in National Defense: Trustworthy Systems in Trustless World," Jun. 2016.

* cited by examiner

# DISTRIBUTED INCORRUPTIBLE ACCORDANT MANAGEMENT OF NONLOCAL DATA FUSION, UNIFIED SCHEDULING AND ENGAGE-ABILITY

BACKGROUND

Technical Field

The present disclosure is directed to a blockchain-type system and method that provide synchronized collaborative scheduling as proof of work and tailored conflict resolution.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Cooperative use of physical assets requires fusion of data from various sensors and scheduling and coordination of the physical assets. To get the clearest picture of asset states, sensor data must be fused not just from trustworthy local sensors, but from non-collocated sensors. Fusion of data, scheduling, and coordination is made complicated by the fact that the amount of sensor data, and the diversity of sensor data, continues to increase.

For example, coordination of allied combat systems involves such a cooperative use of assets. Next generation combat systems will need to track multiple targets via data fusion from multiple non-collocated sensors, find and agree on schedules to engage those targets using multiple non-collocated weapons platforms, and do so while resisting cyber-attack and other risks associated with network centric warfare.

As another example, self-driving cars also may involve a cooperative use of assets, as they may need to communicate measured kinematic state information with each other while solving distributed collision avoidance algorithms, all while remaining robust to network errors, malicious civilian adversaries, and other network risks. Swarms of commercial drones may involve a cooperative use of assets, as they may need to share kinematic state information to coordinate flight paths while solving a distributed scheduling problem (e.g., for product delivery). Networks of commercial satellites may involve a cooperative use of assets, as they may need to share kinematic state information with each other while scheduling communications, weather monitoring services, or other missions with commercial value.

Blockchain technology is considered a foundational technology that new global economic/social systems will be built from (see M. Iansiti and K. R. Kajhani, "The Truth About Blockchain," *Harvard Business Review*, 18 Jan. 2017, incorporated herein by reference in its entirety). Specific applications of blockchain technology are deemed disruptive innovations, i.e., innovations that will transform industries. Over the past few years, blockchain technology has found applications ranging from healthcare record keeping to supply-chain management.

It is one object of the present disclosure to describe a new type of blockchain where the computational effort expended in scheduling or distributed collision avoidance is used to secure the blockchain. This aspect exploits the fact that collaborative constrained optimization functions share key computational properties with conventional "proof of work" functions used in existing blockchain technology. This aspect adds additional security as a sender is required to "prove loyalty" by contributing to solution of a constrained optimization problem to gain trust. It is a further object of the present disclosure to describe a conflict resolution method in which a conflict is resolved by scoring conflicting chains according to physical plausibility, and chain length. It is a further object of the present disclosure to describe a method of trustworthy fusion of data together with secure collaborative scheduling and coordination of assets.

SUMMARY

In an exemplary embodiment, a system includes a memory configured to maintain a secured chain of linked messages that include object states and schedule portions; and circuitry configured to receive a message related to an updated state of an object, determine whether the updated state of the object should be linked into the secured chain of linked messages, determine a portion of a schedule for addressing the object based on the updated state of the object as proof of work, create a new message that links the updated state of the object into the chain to form an updated chain of linked object state messages and includes the determined portion of the schedule, and broadcast the new message as the secured chain of linked messages.

In another exemplary embodiment, a method includes receiving, using circuitry, a message related to an updated state of an object, determining, using the circuitry, whether the updated state of the object should be linked into the secured chain, determining, using the circuitry, a portion of a schedule for addressing the object based on the updated state of the object as proof of work, creating, using the circuitry, a new message that links the updated state of the object into the secured chain of linked messages to form an updated chain of linked object state messages, and that includes the determined portion of the schedule, and broadcasting, using the circuitry, the new message as the secured chain of linked messages.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
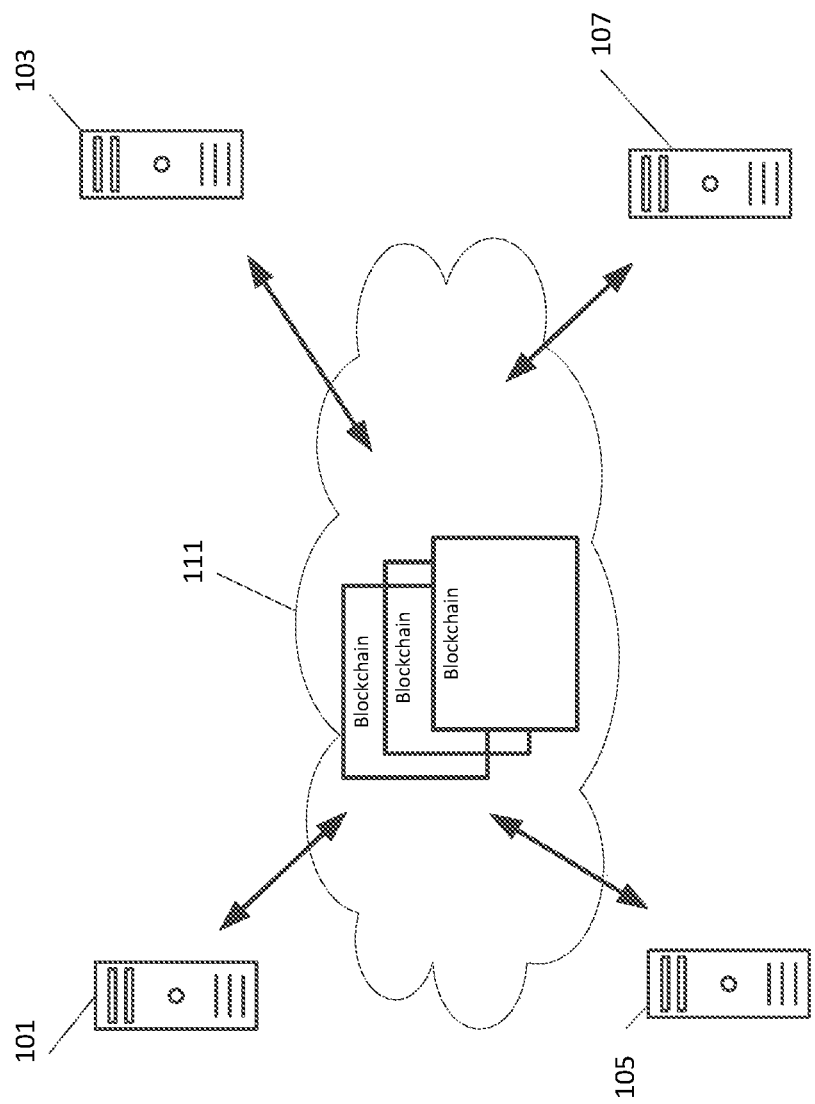
FIG. 1 is a block diagram of a distributed ledger system in accordance with exemplary aspects of the disclosure.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

In the drawings, like reference numerals designate identical or corresponding parts throughout the several views.

Generally speaking, aspects of the present disclosure can relate to (1) trustworthy yet efficient fusion of data from remote sensors, and/or (2) secure collaborative constrained optimization problem solving and coordination of assets.

Blockchains create an unmodifiable ledger of records (i.e., blocks) by including in each ledger-entry an irreversible signature (i.e., hash) of the previous block, which in turn includes the hash of its previous block and so on, all the way back to the root block. Data within each block is typically represented using a hash-based data structure called a Merkle Tree.

Since the hash included in a block contains information tracing all the way back to the root block, any block's entire historical integrity can be quickly validated just by checking its hash. If checking the hash reveals that there are conflicting versions of the blockchain (due to network error, malicious attack, etc.) a blockchain system has an application dependent method of scoring the chains to determine which chain is valid and which chain(s) should be discarded.

To ensure that adversaries with powerful computers cannot forge a new block by re-generating the entire blockchain from scratch, many blockchain systems also include an application dependent proof-of-work (POW). The POW is a problem that a system must solve (and prove that it solved) before adding a block to the blockchain. Nodes check if the POW is valid before adding a potential new block to their own copy of the ledger. So, to add value, a POW problem is typically (a) computationally difficult to solve, and (b) computationally easy to validate.

Aspects of this disclosure are directed to secured/trustworthy collaborative data fusion and scheduling that replaces the conventional proof of work consensus method of blockchain with a scheduler proof of work system, and to a specialized conflict resolution system.

Similar to proof of work used in many blockchain techniques, the scheduler proof of work determines a solution that is hard to identify, but computationally easy to check whether it is right or wrong. However, conventional proof of work algorithms derive a consensus by requiring that sender computes a string of digits which when concatenated with the data in the block and passed through a hash function yield an output number less than an arbitrarily chosen value. The scheduler proof of work performs more than establishing proof of work, by contributing to a solution of a constrained optimization problem, such as determining an optimum or near optimum schedule based on a cost function.

Conventional blockchain technology scores chain length to resolve conflicting chains. The disclosed conflict resolution system resolves conflicts by scoring conflicting chains according to physical plausibility of the reported schedules and target state data and chain length.

FIG. 1 is a block diagram illustrating a general blockchain system. A computer network 111 includes the distributed system of nodes 101, 103, 105, 107 that store and execute the blockchain.

Each node may be one or more computer systems that are connected by way of a computer network 111. The blockchain algorithm may be run on multiple nodes on a single platform, or the algorithm may be run on a platform in a vehicle which has only one computer system. In the latter case, the blockchain system may be performed as multiple vehicles which are communicating over the network, and they all have one computer per vehicle. Also, in some embodiments, the blockchain system may be completely automated. The blockchain system may solve a constrained optimization and take action on its own, or depending on how the doctrine was set up, the system may report the schedule to a human who would then decide to take the action.

Figure 2:
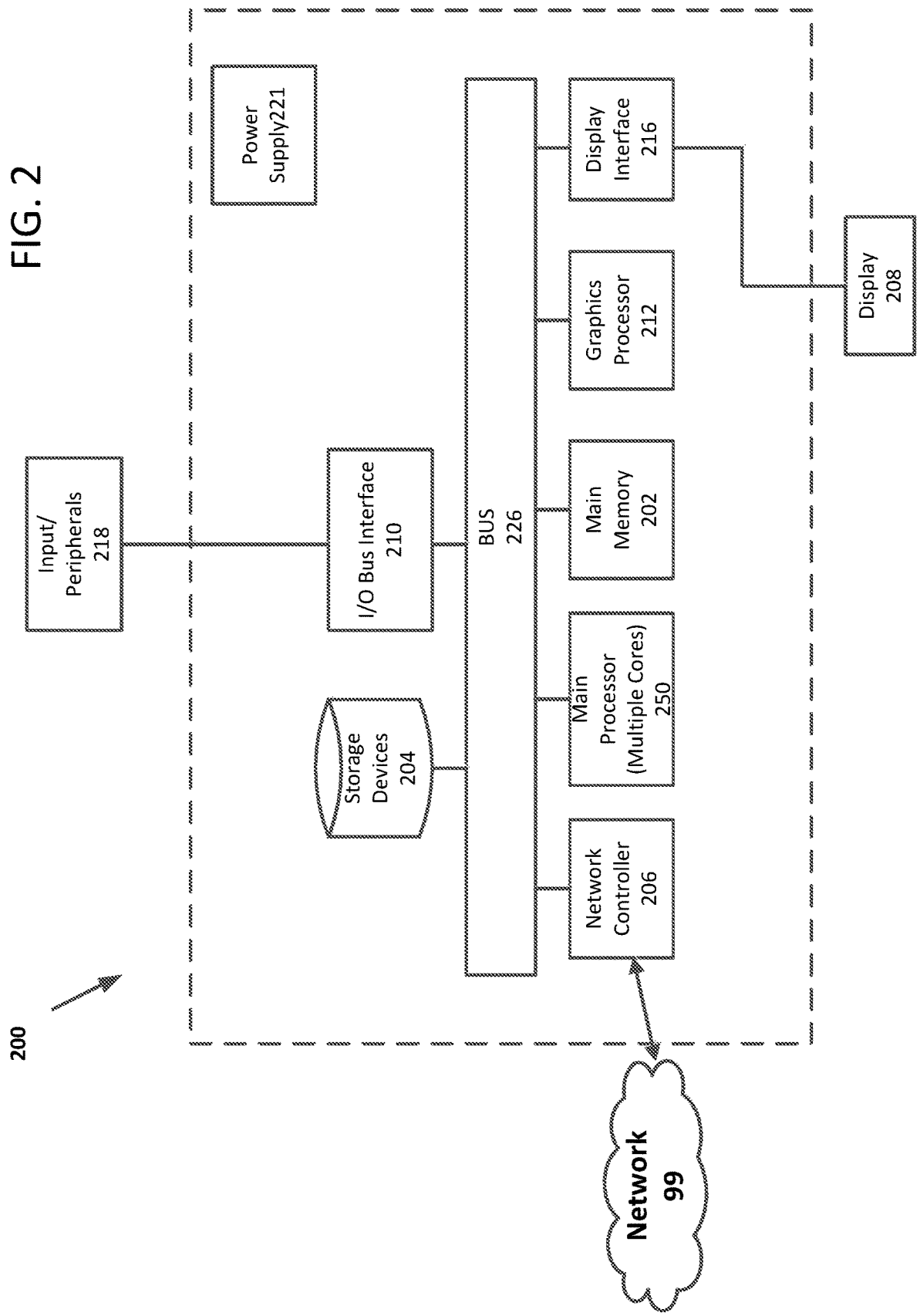
FIG. 2 is a block diagram of an exemplary computer system as a node of the distributed ledger system.

FIG. 2 is a block diagram illustrating an exemplary computer system for a node of a blockchain system. The computer system may be a server or workstation running a server operating system, for example Windows Server, a version of Unix OS, or Mac OS Server. However, the computer system may be any computer device configured with minimum hardware to run a blockchain algorithm.

The computer system 200 may include circuitry implementing one or more processing cores 250 and one or more graphics processors 212. The graphics processor 212 may perform many of the mathematical operations of the scheduler proof of work method, generating a hash function, and other blockchain functions performed in a node. The computer system 200 includes main memory 202, typically random access memory RAM, which contains the software being executed by the processing cores 250 and graphics processor(s) 212, as well as a non-volatile storage device 204 for storing blockchain data and the software programs. Several interfaces for interacting with the computer system 200 may be provided, including an I/O Bus Interface 210, Input/Peripherals 218 such as a keyboard, touch pad, mouse, Display Interface 216, and one or more Displays 208, and a Network Controller 206 to enable wired or wireless communication through a network 99. The interfaces, memory, and processors may communicate over the system bus 226. The computer system 200 includes a power supply 221, which may be a redundant power supply.

Figure 3:
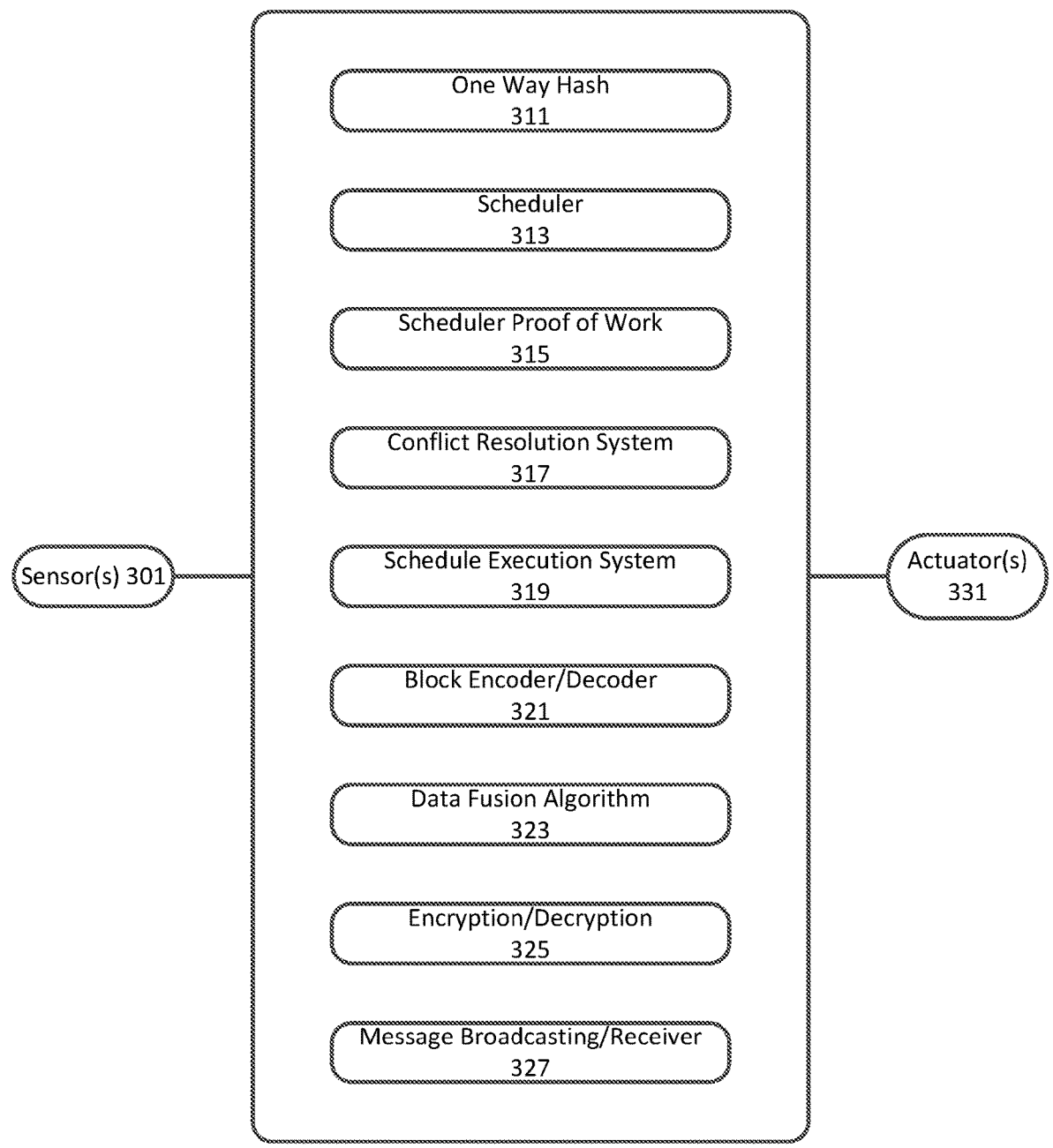
FIG. 3 is a block diagram of components of a node of the blockchain-type system in accordance with exemplary aspects of the disclosure.

FIG. 3 is a block diagram of components of a node of the blockchain-type system. In this disclosure the term blockchain system is defined as a type of distributed ledger system that includes security measures such as encryption and a hash function. The term blockchain-type system as disclosed herein does not imply a conventional blockchain system. The blockchain database is implemented as a distributed ledger. In disclosed embodiments, nodes of the blockchain-type system may include hardware and software components that perform scheduling and schedule execution, scheduling proof of work, conflict resolution, data fusion, and encryption/decryption.

The hardware and software components can include a one-way hash function 311, scheduler/schedule solver 313, scheduler Proof of Work (SPOW) 315, and Conflict Resolution System (CRS) 317, which includes message authenticity validation, heuristics-based physics validation, and adaptive trust weighting system. Message authenticity validation includes checks for valid data formats, for example the correct data types in the correct fields, in addition to checking the hash of each block. Adaptive trust weighting allows users or algorithms to specify that some nodes (e.g., nodes that are harder to compromise) should be weighted more heavily than others in the event that a conflict resolution must occur. Further software/hardware components include schedule execution system 319, which includes schedule encoding/decoding, schedule choosing system/activation function, and a system to receive/process collaborator feedback. Still further components include Block Encoder/Decoder 321, Data Fusion element 323, Encryption/Decryption 325, and Message broadcast/receive system 327. The node may receive sensor data from remote sensors 301, and may control various actuators 331. A description of these components is provided below.

Figure 4A:
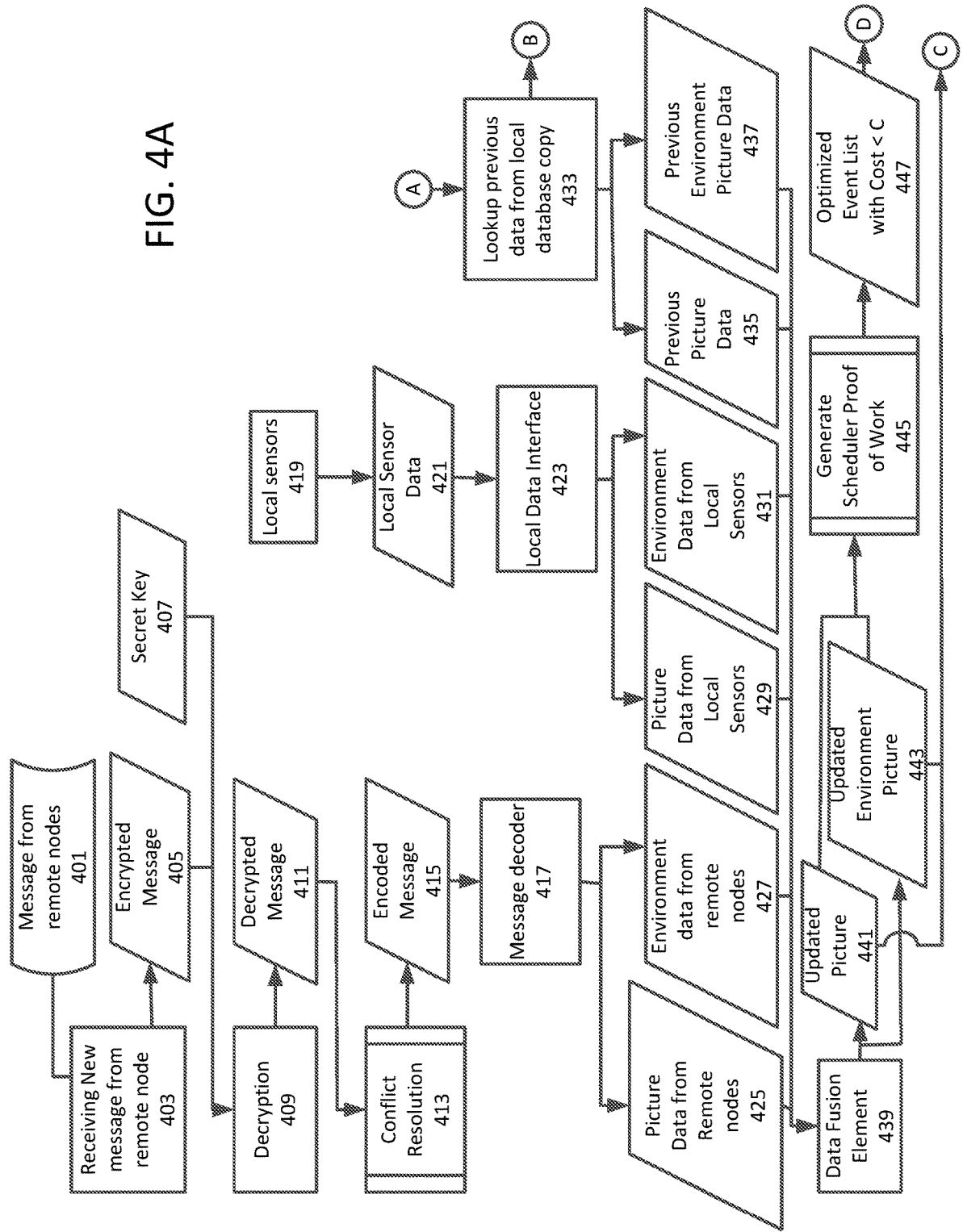
FIGS. 4A and 4B are a system diagram of a node of the blockchain-type system architecture in accordance with exemplary aspects of the disclosure in accordance with exemplary aspects of the disclosure.
Figure 4B:
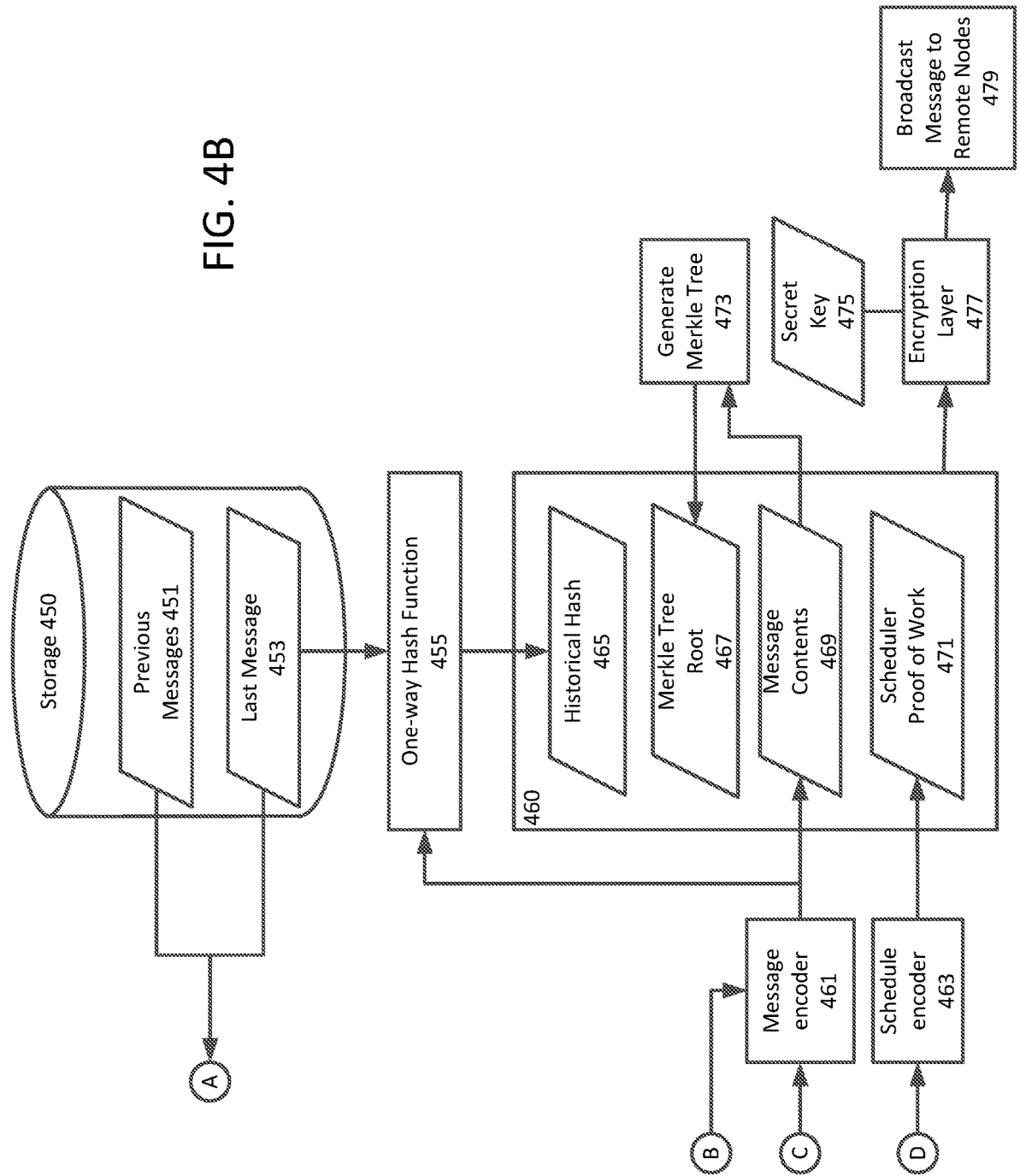

A diagram of interactions of the hardware and software components of a node is provided in FIGS. 4A and 4B. Arrows in the diagram relate to interaction to send a message. Other interactions, such as receiving messages, are left implicit.

In 401 messages from remote nodes may include target state information. In this disclosure, a target may be any object that is monitored, detected, tracked by one or more sensors. In most instances, the object is a moving object that changes position over time. Target state data may include measurements of position such as range-azimuth-elevation measurements typical of a radar, azimuth-elevation only measurements typical of optical sensors, or similar information represented in a different coordinate system, such as East-North-Up (ENU) or Earth-Centered-Earth-Fixed (ECEF). Furthermore, target state data may also include velocity in a given coordinate system such as ENU or ECEF, whether measured directly as in a radar range-rate measurement or inferred/approximated by a number of algorithms well known to those skilled in the art, such as the Kalman filter, Extended Kalman Filter, or another track filter. Furthermore still, target state data may include higher derivative kinematical information such as acceleration, jerk, or any other kinematical information whether measured directly or inferred/approximated by a filtering or measurement processing technique. Other target state data may include information about the size/dimensions of the object, whether the object is friend or foe, a possible destination, and other attributes of the object. In some embodiments, the target state data is fit to mathematical function, such as a polynomial, and the coefficients of the polynomial are passed along with the target state data to allow receiving nodes to quickly extrapolate predicted target position at times in the future.

In some embodiments, one or more remote sensors share target-state data with nodes of the blockchain system. In some embodiments, the remote sensors may include radar, infrared sensor, sonar, and optical sensor such as a laser sensor or a camera. A camera may be any of several types, including 2-D camera, 3-D camera, camera systems with 360 degree view, and cameras with lenses capable of various resolutions, cameras capable of capturing images in various lighting conditions including dark. A radar may be of various types that can operate at various ranges.

In 403, a new message may be received from a remote node, and in 405 stored as an encrypted message. In some embodiments, message information sent from other nodes may have been encrypted (Encryption layer 477) and thus may require decryption. In such case, the encrypted message may be decrypted using a secret key 407 using a decryption method 409 into a decrypted message 411. The type of decryption method may depend on the type of encryption used by the encryption layer 477.

A conflict resolution system 413 may perform message authentication and validation, heuristics-based physics validation, and adaptive trust. The conflict resolution system 413 checks a hash of target state messages and encoded scheduler proof of work. Encoded message contents 415 contained in the message may need to be decoded in message decoder 417 to extract target state data. In some embodiments, the platform having hardware and software components of a node may include local sensors 419. Local sensor data 421 obtained from local sensors 419 may be read using a local data interface 423. In addition, previous sensor data may be read using a database interface 433 for a local database.

Output from the message decoder 417 may include picture data from remote nodes 425 and environment data from remote nodes 427. Output from the local data interface 423 may include picture data from local sensors 429 and environment data from local sensors 431. Output from the database interface 433 may include previous picture data 435 and previous environment picture data 437. Previous picture data 435 may be a data type containing information on states of all targets or platforms. Previous environmental picture data 437 may be a data type containing information about the environment, for example, atmospheric data, or celestial body positions, to name a few. Target state data including currently received data, local sensor data and previous data may be fused with other target state data by a data fusion element 439.

Data fusion may be collaborative data fusion that combines sensor data from multiple sources. The types of data fusion algorithms implemented may range from simple combination of data from various sensors, for example combination of radar range measurements with optical azimuth and elevation measurements, to more involved algorithms that use statistical methods; e.g., determining a covariance matrix for a sensor; the covariance matrix defines an ellipsoid in 3-D space, or higher dimensional space for 6 state (e.g., position and velocity) or higher measurements. The sensor or platform may interpret this information as though the target is within this space with high probability. There may be multiple ellipsoids with multiple sensors. The intersection of those multiple ellipsoids may be a position where the target has the highest probability of existing.

An output of the data fusion element 439 may include updated picture data 441 and updated environment picture data 443. In 445, the updated picture data may be provided in order to generate scheduler proof of work 445. The output of the scheduler proof of work 445 may include an optimized event list 447 with Cost <C, where C is a predetermined threshold. The scheduler proof of work generator 445 will be described in more detail below.

Figure 5:
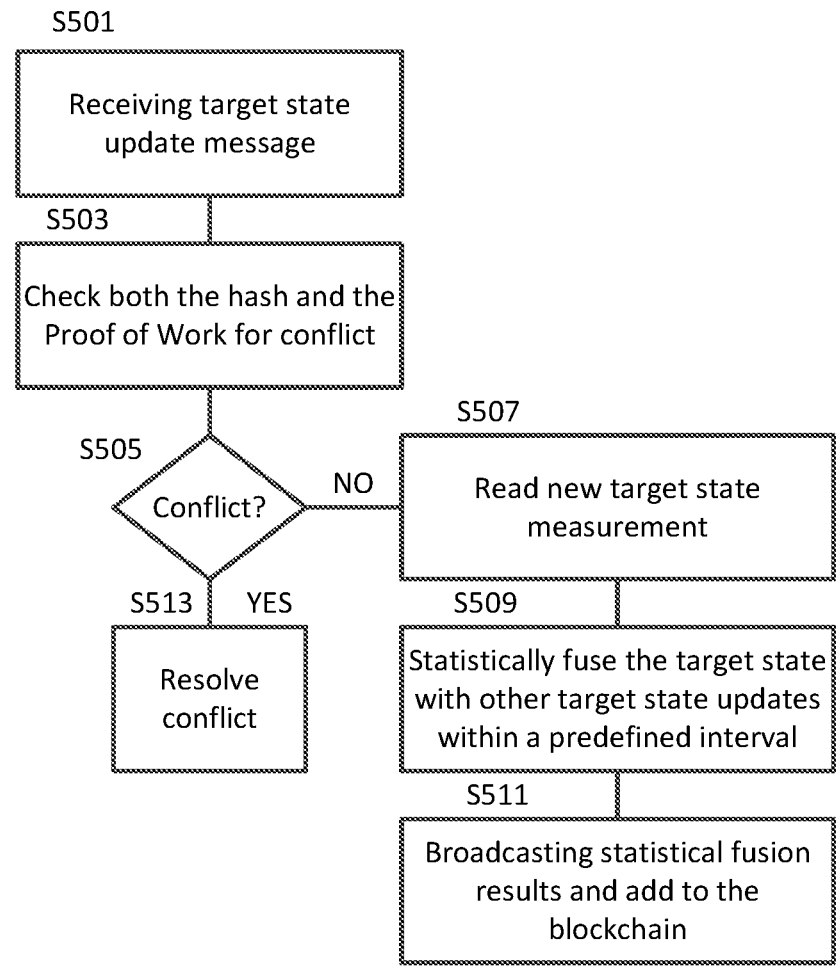
FIG. 5 is a flowchart of a method for processing a state update message in accordance with exemplary aspects of the disclosure.

FIG. 5 is a flowchart of a method for processing a state update message. As sensors share target-state data, all sending and receiving nodes on the network maintain a common blockchain (blockchain database 450). Target state messages are broadcasted with an easily computed yet irreversible hash signature (Historical hash 465). The input of the hash 455 can be the concatenated previous target state update message content-plus-signature 453 and the current target state update message content 461. An example structure for a block includes the following data fields: the hash of the previous block, the root of the Merkle tree formed by hashing the current data entries in the block, the time stamp of the block, the current target cost which the scheduler proof of work is asked to optimize toward, and the scheduler proof of work. Note that entries in a block can include filtered or unfiltered sensor data, data fusion results, and other system messages such as collaborator feedback on chosen schedule solutions.

In S501, when another node on the network receives a target state update message, the conflict resolution system 317 can perform the following:

In S503, check both the hash 465 and the Scheduler Proof of Work 471 for a conflict. In this disclosure, a conflict is a disagreement among nodes as to whether a block should be added to a blockchain. Such disagreements may occur where the length of local copies of blockchains differ. A node may determine that a target schedule timeline is incorrect.

If there is a conflict (YES in S505), resolve by scoring the conflicting chains according to both physical plausibility (for SPOW) and chain length (for hash). In some embodiments, the longest chain is considered the correct chain when a conflict is detected. The physical plausibility may be determined based on a heuristics-based physics model that is configured to detect if the target would be near the intercept/lasing point according to the predicted schedule, where a check is made to determine if the target timeline is correct. For example, a target timeline can be checked based on target states that are already known from previous messages and data fusion results. The physical plausibility may be determined based on a mean square error between a predicted schedule and the physics model.

Otherwise if there is not a conflict (NO in S505), in S507, Message decoder 417 reads the new target state measurement, and in S509, Data fusion element 439 statistically fuses the target state data with any other target state updates received within a user specified interval. In S511, New message creator 461 broadcasts the statistical fusion results to be added to the common blockchain (blockchain database 450).

With the method of FIG. 5, one or more of the following objectives can be achieved: (1) Each node can be sure that it has an incorruptible record of all target data measurements and all target data fusion results obtained by each other node on the network. (2) Conflicts may be resolved by any combination of the following: (a) checking which data points are most reasonable with respect to the laws of physics; (b) statistically fusing conflicting data points; (c) validating the complete historical integrity of the chain of measurements and/or results. (3) The data fusion results have several layers of robustness. Such a strong mutual accordance can facilitate simultaneous and collaborative engagement of complex threats.

Further regarding FIG. 4B, the common blockchain database 450 includes the last message received 453, and previous messages 451. The updated picture data 441 and updated environment picture data 443 may be provided to the message encoder 461. In addition, data obtained from the database lookup 433 may also be provided to the message encoder 461. The optimized event list 447 may be provided to a schedule encoder 463. A one-way hash function 455 may compute a hash signature for the last message 453 and encoded data from message encoder 461.

In disclosed embodiments, a scheduler proof of work system 315 may perform a scheduling operation that also serves as a proof of work. A new message may be arranged as a Merkle tree root 467, historical hash 465, message contents 469 which are used to generate a Merkle Tree 473, and scheduler proof of work 471. In some embodiments, a new message may be encrypted in the encryption layer component 477 using a secret key 475. An encrypted new message may be broadcast 479 to other nodes in the blockchain system.

One-Way Hash Function

Each time any message (data fusion, measurement, schedule, etc.) is created, it is broadcasted to the fleet with a hash of its contents and the hash of the previous message concatenated with its respective hash 465. Any cryptographically secure hash function will work for this application. Hash functions do not introduce much computational overhead compared to other common operations such as input/output. This was confirmed in the studies that lead to the disclosure of the Hashing Enhanced Algorithm for Regression Testing (HEART). (See M. J. Sanchirico III, "Hashing Enhanced Algorithm for Regression Testing," Mount Laurel, N J, 2017.) Specialized hardware is also available to efficiently compute common secure hash functions, such as Intel's instructions to support the Secure Hash Algorithm (SHA) family. (See Intel, "Intel Developer Zone," July 2013. [Online]. Available: https://software.intel.com/en-us/articles/intel-sha-extensions. [Accessed 4 Apr. 2018].)

Scheduler/Schedule Solvers

In disclosed embodiments, a schedule solver may be considered as being comparable to the role of solver of a hash function used in conventional blockchain systems. In a similar role to a hash function that maps a large input space onto a small output space, a schedule solver maps a hyperdimensional set of optimization parameters onto a unidimensional cost metric.

On the other hand, the work of determining a schedule is not divided up by requiring the nodes to contribute their own divided schedule individually. Instead, each schedule solver may be initialized by randomized initializer. Subsequently, each node on the network starts optimizing the entire schedule at a random initialization point. As such, the scheduling problem is tightly coupled—each node's contribution depends on the contribution of all the other nodes. Otherwise, in the case of merely dividing up the scheduling, their results could easily be invalidated by the later contributions of another node on the network. By having each system perform steepest descent on a random portion of the scheduling optimization hypersurface, and then broadcast its results to the group, the entire collective will establish a clearer picture of the scheduling space as a whole.

In disclosed embodiments, the scheduling problem may be framed as a multidimensional constrained optimization problem, using a hypersurface cost function J(·) that can be leveraged from various types of cost functions. A cost function may include states with a goal of determining intervals and/or times that result in a cost below a critical value $y_c$ (a threshold cost). As a minimum, the cost function is defined and differentiable on all dimensions, and given an arbitrary starting point in the multidimensional solution space, a solution can be searched toward a local minimum using steepest descent or other incremental optimization methods.

An exemplary cost function for a laser weapon system may include, for each laser firing event, the following terms to be minimized: (1) the square of the cosine of the angle between the laser and the target surface, (2) the square of the cosine of the elevation angle of the laser aperture, (3) the earliest time to defeat the target. To evaluate such a cost function, a target's trajectory may be divided into a number of discrete lasing opportunities (T_START). At each opportunity, a calculation may be run to compute the time that the target will be defeated (T_STOP) given that particular T_START. This calculation may take into account atmospheric conditions, target range, and orientation, among other variables. Then the three terms defined above may be integrated from T_START to T_STOP to obtain the cost of the given T_START-T_STOP pair. In this example, an arbitrary starting point may be a subset of the discrete lasing opportunities.

Scheduler Proof of Work System

In disclosed embodiments, determination of a schedule is performed in place of a conventional proof of work operation. Similar to proof of work consensus algorithms, the scheduler proof of work (SPOW) system 315 involves a problem that is difficult to solve, i.e., a scheduling problem, but a correct solution is computationally easy to verify. Instead of following the trend of finding an SHA hash that is less than a certain number (a value that is otherwise useless), the SPOW system 315 solves a portion of an overall scheduling problem, encodes the schedule portion as a scheduler POW, and broadcasts that solution to the group of nodes as proof of work.

The SPOW problem can be used in place of conventional POW because the schedule solver may be thought of as a type of hash function. Just as a hash function maps a large input space onto a small output space, a scheduler may be implemented to map a hyper-dimensional set of optimization parameters onto a unidimensional cost metric. Such a mapping may be considered as a type of hash function, even though it may not be a cryptographically secure hash function.

Since embodiments of the disclosed common blockchain database are already dually protected via the secure hash of the blockchain's history and via the secure encryption layer, the requirement for cryptographically secure proof of work may be relaxed in favor of the strategically secure and intrinsically valuable scheduler-based Proof of Loyalty.

Figure 6:
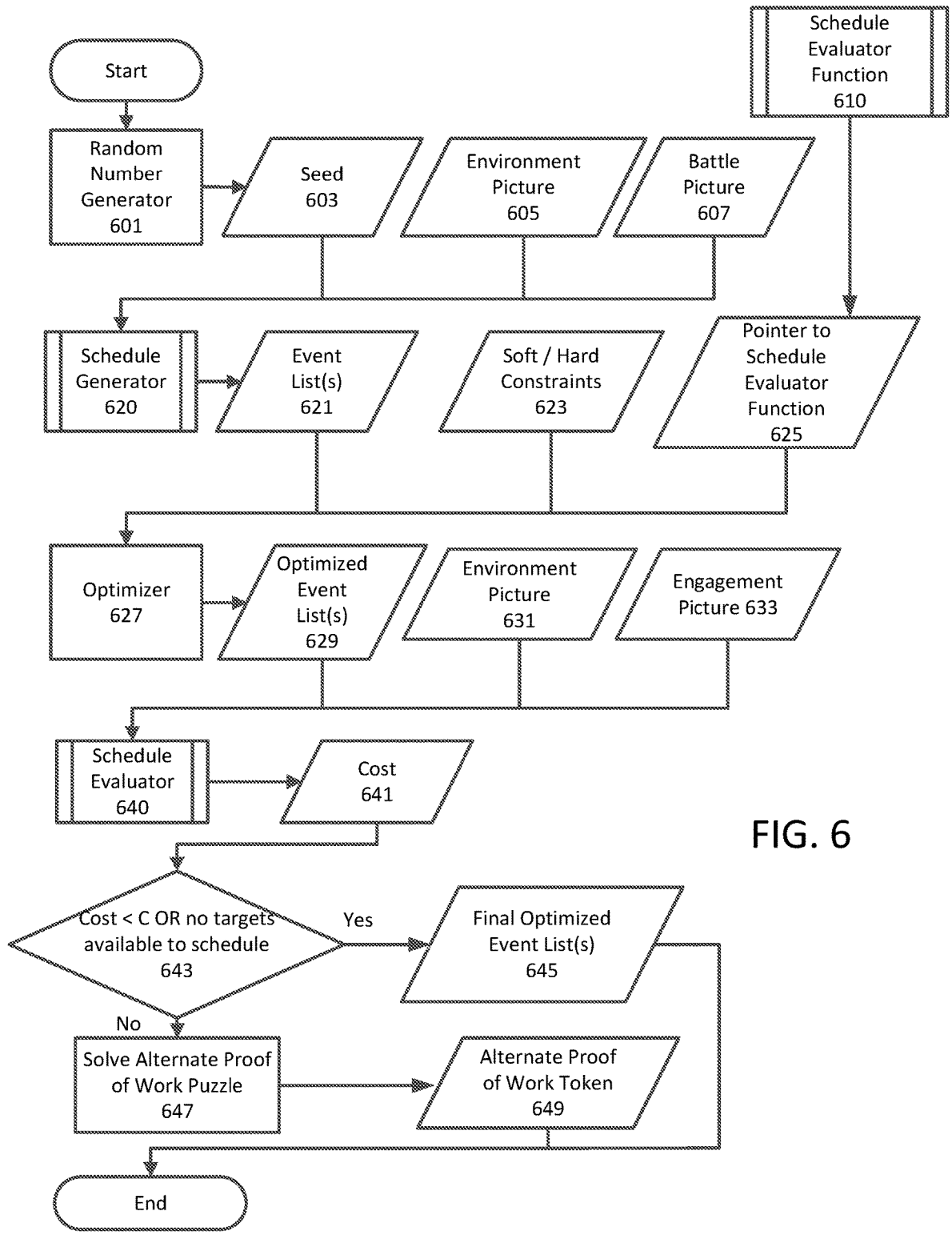
FIG. 6 is a flowchart for a scheduler proof of work generator in accordance with exemplary aspects of the disclosure.

FIG. 6 is a flowchart of a scheduler proof of work generator 445. The scheduler proof of work system 315 may include a randomized initializer 601 and one or more schedule generators 620. The random initializer 601 starts the schedule optimization by a schedule generator 620 at a random initialization point. By starting schedule optimization at a random initialization point, different nodes may handle different portions (e.g., solving for local optima) of the overall schedule optimization. One or more schedule portions may be encoded by a schedule encoder 463, and submitted as a scheduler proof of work 471.

In particular, a seed 603, environment picture data 605, and engagement picture 607 may be provided to the schedule generator 620. The Schedule Generator 620 may be configured to return multiple potential Event Lists 621 to be tuned by the Optimizer 627.

Constraints 623 may be passed to the optimizer 627 along with a pointer 625 that points to the Schedule Evaluator function 610. The optimizer 627 may use any of a number of known methods, such as steepest descent search, to adjust the times at which events in the Event List(s) 621 occur such that the constraints are minimized/maximized. Hard constraints may include: a laser shall not be fired at a time when the laser aperture is pointing within a certain angle of the sun; a laser shall not be fired at a time such that the line of sight extending from the laser will come within a critical distance of an ally; a missile may not be fired such that its intercept point with its target will be within a certain distance of an ally, among others. Soft constraints may be values that come as close as possible to a preferred value associated with the constraint, but may not reach the preferred value. Soft constraints may also be tolerances for constraint values such that preferred values may be exceeded within a certain tolerance level.

The Optimizer 627 can take as inputs an Event List(s) 621 and the pointer 625 to the Schedule Evaluator function. The Optimizer 627 adjusts the start times associated with the Events in the Event List(x) 621 to decrease the cost that is returned when the Adjusted Event List is evaluated by the Schedule Evaluator 640. The Optimizer 627 returns an Optimized Event List 629 with the start times associated with each Event adjusted such that the cost returned by the Schedule Evaluator 640 is lower when the Optimized Event List 629 is Evaluated. Some Event Lists 621 may be eliminated by the Optimizer 627 if their cost does not decrease below some value C after some number of iterations inside the Optimizer 627. In order to prevent excessively long run times, the optimizer 627 may return an Optimized Event List 629 if a maximum number or iterations is reached or if a maximum runtime is reached.

The Optimized Event List 629, environment picture data 631, and engagement picture data 633 may be provided to the schedule evaluator 640. The schedule evaluator 640 may determine a cost for a schedule in accordance with a cost function. The schedule evaluator 640 can output a final cost 641. In 643, the final cost 641 can be compared to a critical cost value C. In some embodiments, the critical cost value C required for an Optimized Event List 629 to be considered proof of work may be adjusted or kept constant. For example, each time an Optimized Event List 629 with a cost less than C is identified, a new smaller C may be set such that nodes are required to continue improving event lists. In 643, a determination is made as to whether no targets are available to schedule. In the case that the cost is less than the critical cost C or there are no targets available to schedule (YES in 643), the scheduler proof of work generator 445 outputs one or more final optimized event list(s) 645.

In some embodiments, if computing hardware resources allow, the entire Scheduler Proof Of Work algorithm may be run multiple times, sequentially or in parallel. Nodes may then demand as Proof Of Work a series of multiple Final Optimized Event Lists 645, all with a cost less than the critical value C. As with the case where a single Event List is returned as Proof Of Work, an alternate Proof Of Work function 647 may be substituted by a node if enough Optimized Event Lists 629 meeting the critical cost cannot be found (NO in 643).

Even after the Optimizer 627 runs to completion, it is possible that the resultant Optimized Event List(s) 629 still has(have) a cost greater than the desired critical value C when evaluated by the Schedule Evaluator 640. In this case (NO in 643), any Alternate Proof Of Work function may be solved 647 and returned along with the Final Optimized Event List 645. The Alternate Proof Of Work function may have tunable difficulty so that users or other algorithms may adjust the time it takes to compute the Alternate Proof Of Work Token 649.

Figure 7:
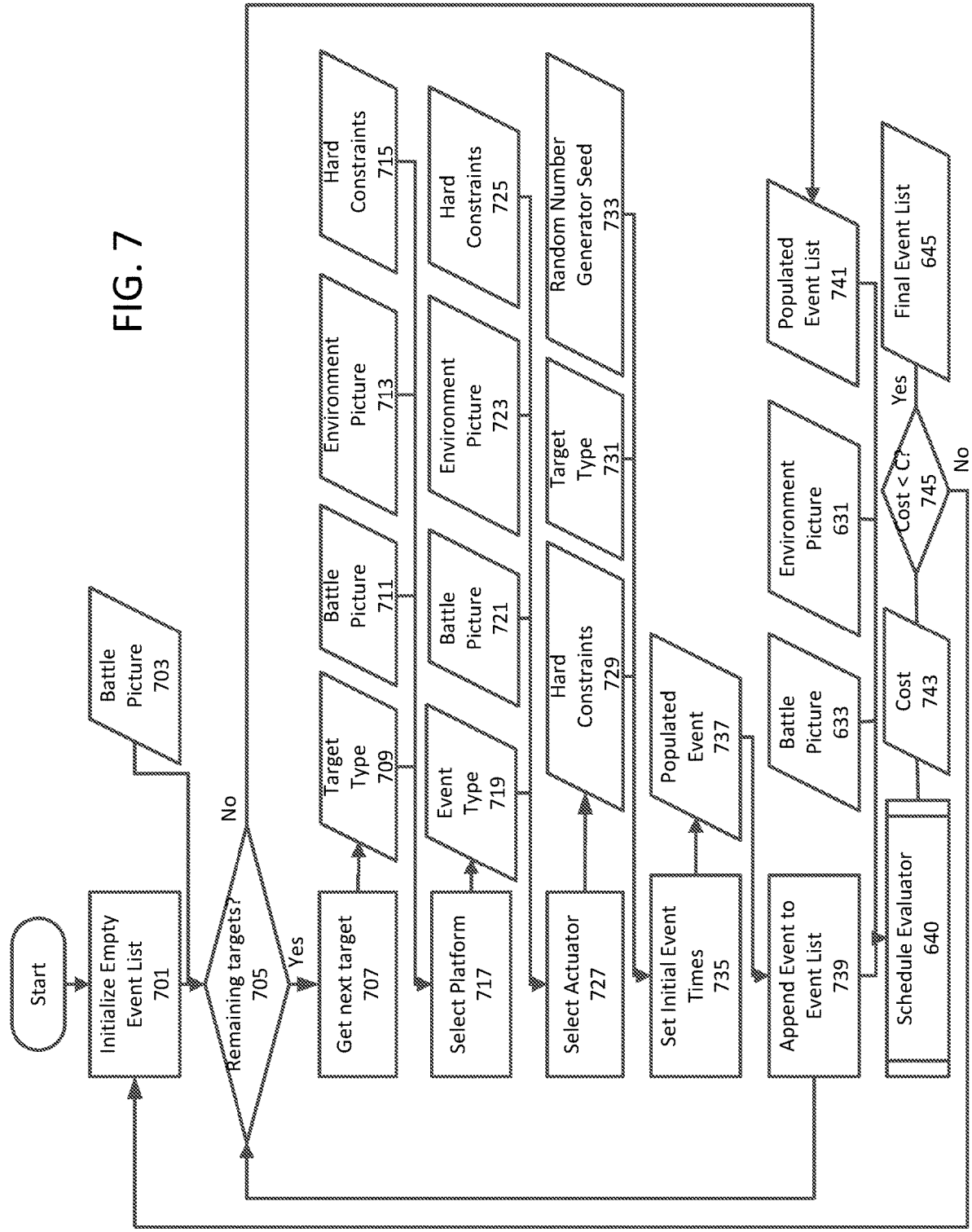
FIG. 7 is a flowchart for a schedule generator in accordance with exemplary aspects of the disclosure.

Details of the schedule generator 620 are shown with regard to the flowchart in FIG. 7. A goal of the Schedule Generator 620 is to generate initial Event Lists (i.e., initial schedules) in a pseudo-random fashion. The Event Lists should (a) not violate any hard constraints and (b) have an acceptable cost. In some embodiments, the Optimizer 627 in the Scheduler Proof Of Work algorithm may further tune start times of Events in the Event List to further decrease the cost until an Event List that is acceptable as Proof Of Work is generated, or until the algorithm hits a maximum runtime/iteration cap, and an alternate Proof Of Work is generated and broadcasted along with the Event List.

The schedule generator 620 may initialize an empty event list 701 and obtain an initial picture 703. The schedule generator 620 may iterate over targets in the picture 703 until no targets remain (NO in 705). At each iteration, a target is obtained in 707, which may include a target type 709, picture 711, environment picture 713, and hard constraints 715.

A platform 717 may be selected to engage a target using a number of platform-target pairing methods including: (1) hard rules pairing specific platforms to specific target types, (2) rules selecting the platform with the highest historical probability of success for a known type of target, (3) machine learning platform-target pairing algorithms which may be trained using historical data to pair a platform with a target type, (4) rules selecting initial platforms according to preset statistics; for example, engage missile targets with platform 1 for 20% of initial schedules and engage missile targets with platform 2 for 80% of initial schedules. The selected platform 717 may include an event type 719, a picture 721, an environment picture 723, and hard constraints 725.

An actuator 727 may be selected to engage a target using a number of actuator-target pairing methods including: (1) hard rules pairing specific actuator types to specific target types, (2) rules selecting the actuator with the highest historical probability of success for a known type of target, (3) machine learning platform-target pairing algorithms which may be trained using historical data to pair a platform with a target type, (4) rules selecting initial actuators according to preset statistics; e.g., engage missile targets with a laser actuator for 20% of initial schedules and engage missile targets with a missile actuator for 80% of initial schedules. In some embodiments actuator type may be chosen first, allowing actuator type to influence platform selection.

Hard constraints 729 may be determined prior to running the Schedule Generator 620. The Schedule Generator 620 will set the initial times of an event such that they do not violate a hard constraint. Examples of hard constraints may include: do not schedule a laser engagement such that the laser aperture will point too close to the sun, do not schedule a laser engagement such that the laser aperture will point near an ally while firing. Hard constraints may be platform or weapon specific.

Hard constraints 729, target type data 731, and random number generator seed 733 may be used to set initial event times 735 and generate a populated event 737. In 739, the populated event 737 may be appended to an event list 739. When there are no more remaining targets (NO in 705), the populated event list 741, environment picture 631, and picture 633 can be provided to schedule evaluator 640, such as in FIG. 6, to obtain a cost 743.

In some embodiments, if computing hardware resources allow, the Schedule Generator 620 may be run multiple times to solve for multiple Event Lists 645 having associated cost less than the critical value C 745. Nodes may then demand as Proof Of Work a series of multiple Final Optimized Event Lists from the Scheduler Proof Of Work 445, all with a cost 743 less than the critical value C.

In some embodiments, in the Schedule Generator 620, the critical cost cutoff value C may be different than the critical cost cutoff value set in the Scheduler Proof Of Work Algorithm. The C value in the Schedule Generator 620 may be lower, allowing more valid Event Lists to be generated in the initial phases of scheduling. In the Schedule Generator 620, C may also be adjusted adaptively. If no Event Lists are found with cost less than C, then the C internal to the Schedule Generator 620 may be relaxed so that more Event Lists may be generated. Those Event Lists will then be tuned by the Optimizer 627 in the Scheduler Proof Of Work 445.

Figure 8:
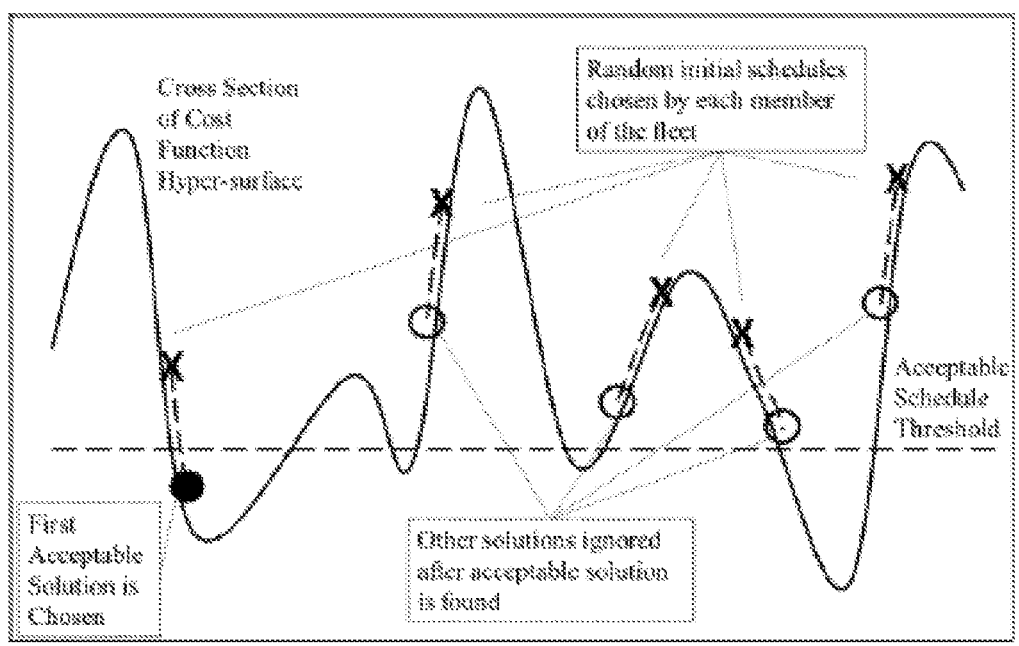
FIG. 8 is a graph of an exemplary cost function.

FIG. 8. is a graph of an exemplary cost function. Each node may make its contribution in the form of a portion of an overall scheduling problem to show proof of work/proof of loyalty. The shape of the cost function hyper-surface (cross section is shown) is excavated. Each node may identify a contribution solution at or near a local minima with cost below a predetermined threshold.

In some embodiments, the scheduling solution may be verified by a node based on physics-based plausibility and time. In performing physics-based plausibility, a checking function may use polynomial heuristics. For example, heuristics, like those in Amabilis, may be derived using the methods in "Obtaining Exclusion Angle from Engagement Opportunity" (See M. J. Sanchirico III, "Approximating the Maximimum/Minimum Angle of Ballistic Object Interference without Lookup-tables, Iteration, or Stepping," Mount Laurel, N J, 2017; M. J. Sanchirico III, "Obtaining Exclusion Angle from an EO Pair," Mount Laurel, N J, 2017.) Time may be used to verify that the proposed schedule timeline passes predetermined checks, such as whether the proposed schedule order makes sense.

Schedule Execution System

A schedule execution system 319 is responsible for deciding when the bank of validated schedule solutions contains an acceptable schedule solution, and then for propagating the chosen solution out to the other nodes. In some embodiments, a predefined activation function may be used to decide when a sufficient solution has been found. The activation function may be one that takes a weighted sum of schedule costs, such as time, probability of success, etc. The weights for the activation function may be tuned to achieve specific strategic goals. Exemplary activation functions include: checks to determine if a schedule below a certain cost has been excavated (i.e., evaluating the cost of the reported schedule in a new block and executing that schedule if it is below a certain cost); checks designed to achieve a strategic goal, such as activating the first schedule excavated with a total completion time less than some threshold, activating a schedule with a probability of success greater than a threshold, or some weighted sum of such terms; and checks which vary as functions of time. An example of an activation function which varies as a function of time would be a check on probability of success that relaxes as a critical deadline approaches; i.e., if an impact is several seconds away, there is time to wait for a schedule with a high probability of success; otherwise, if an impact is approaching, a schedule should be activated immediately to avoid that impact immediately. Note that because each node solves the entire distributed scheduling problem for all nodes, a schedule shared as proof of work/proof of loyalty contains sufficient information for all nodes to execute that schedule.

Regarding again to FIG. 4B, when a valid schedule is activated, it may be encoded in a new message (just like any other block in the chain) and broadcast 479. If collaborators reply that they cannot comply, a different solution can be chosen from memory. With each message sent, more portions of the scheduling cost function hypersurface are excavated, and more scheduling solutions may be found.

Encryption/Decryption Method

In some embodiments, the data in the blockchain must also be unreadable by outsiders while it is in a stored or transmission state. In these embodiments, the other internal components are bookended by an encryption/decryption protocol.

It is noted that any secure encryption layer may be used. Embodiments of the disclosed system operate in real-time environments where the value of data is rapidly decaying as a function of time. Additionally, the variety of hardware on the different components interfacing with the chain requires a cross platform method which is consistent. In some embodiments, AES-GCM (Galois-Counter Mode) provide sufficient security, speed, and platform robustness.

A factor for the encryption/decryption method is the distribution of the shared secret. To achieve this, two distinct methods may be utilized: Predefined Keys or Elliptic-curve Diffie-Hellman (ECDH).

Predefined Keys:

The base shared secret key, initialization vectors, and other requirements used in subsequent key-derivation functions could be hard-coded onto the blockchain ready systems before deployment from secured locations.

This method provides a contained environment for the network and with proper key-management, greatly increases difficulty for exterior threats to send spoofed messages. No key exchanges occur over insecure channels limiting the threat vector.

However, this approach is subject to different vulnerabilities and does not provide the ability to dynamically include/exclude members from the network without rebasing.

Elliptic-Curve Diffie-Hellman:

ECHD is a key agreement protocol which allows parties to generate a shared secret over insecure channels. The subsequent shared secret can further be refined with key derivation functions.

In some embodiments, the key exchange can occur in controlled conditions or allow for on-the-fly additions of newly available members to the network. (For example, a satellite which has entered an effective range to provide data.)

Regardless of which is used, this component will provide needed secure communication capabilities to ensure data is not sent in the clear.

Security

Only a piece of the schedule solution is broadcasted in each message, and the adversary does not have knowledge of the inner working of the function that will finally chose the schedule to use. So, without this knowledge, the schedule solutions pieces are virtually useless—since they don't provide any particular strategic information.

Conflict Resolution System

Figure 9:
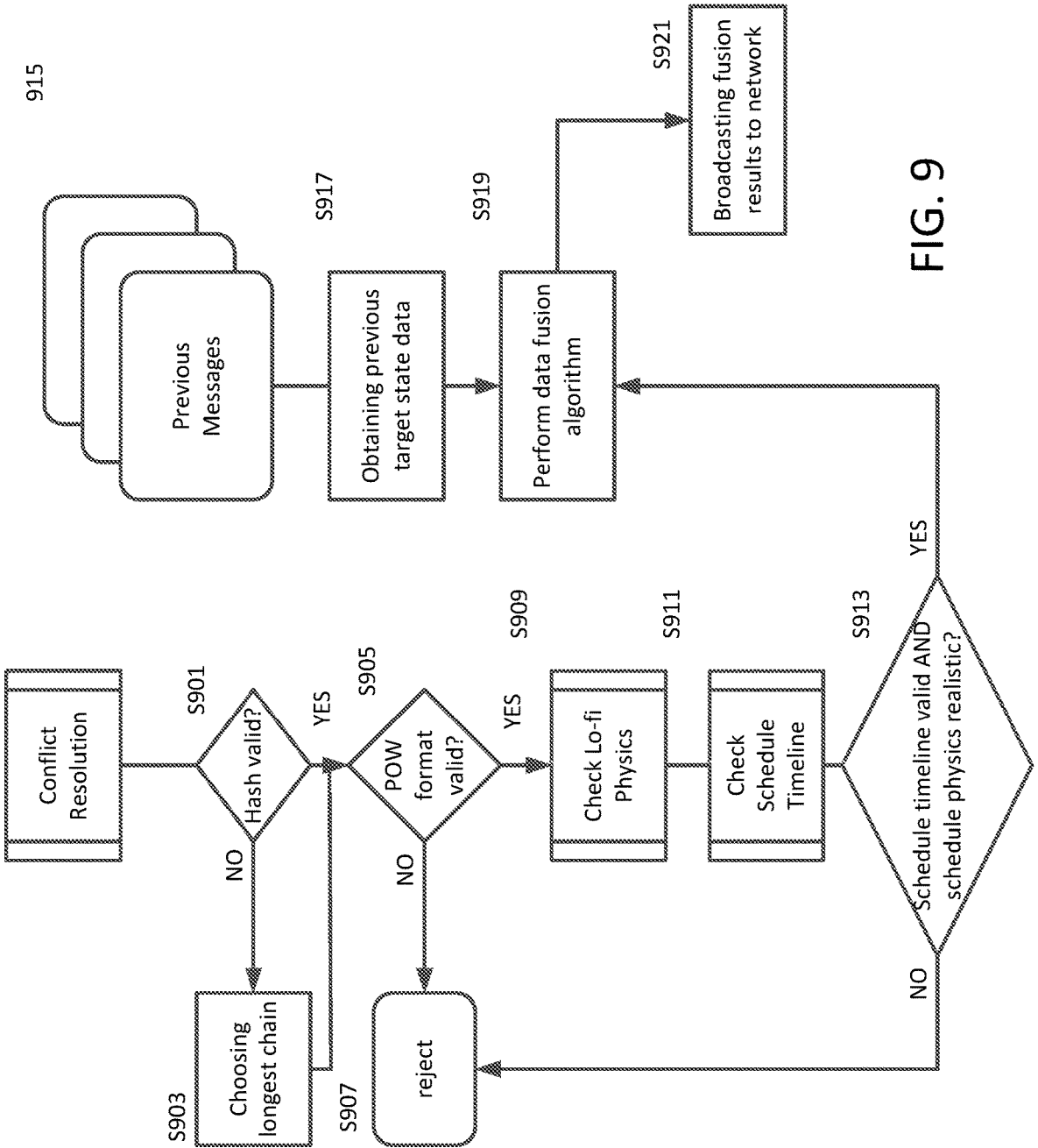
FIG. 9 is a flowchart of a conflict resolution method in accordance with exemplary aspects of the disclosure.

FIG. 9. is a flowchart of a conflict resolution method in accordance with exemplary aspects of the disclosure. The conflict resolution system 317 can perform a method by which the system decides whether a blockchain is valid in order for a new block to be added to the chain. In some embodiments, the method may include three layers of protection against the types of attacks and network problems that would prevent nodes from maintaining a synchronized picture of target states. The three layers of protection may include: (1) blockchain historical integrity checks that keep nodes in sync through network errors and delays; (2) Proof of Work/Proof of Loyalty checks that provide resistance to advanced forgeries, man in the middle attacks, and denial of service attacks; and (3) Data fusion that provides robustness against noise and measurement errors.

Regarding FIG. 9, each time a new block is to be added to the common blockchain, in S901, its hash is checked to validate its historical integrity, and in S903, the longest chain is considered the correct chain in the event of a conflict.

After hash conflicts are resolved, in S905 the scheduler proof of work/proof of loyalty system checks to see if reasonable efforts were made to contribute to the scheduling problem. In some embodiments, in S905 the scheduler proof of work checks the format of the schedule. Each node is required to adhere to a strict format. Format checks made may include, among others, checking the data type stored in each message field, checking the ordering of data fields in the message to make sure it conforms to an expected ordering, and checking to make sure message headers include the correct information in the correct order, such as software version, sender, receiver, timestamp, etc. If any discrepancies are found in the schedule format, in S907 the schedule is rejected.

In S909, a low fidelity heuristics-based physics model checks if the targets will be anywhere near the intercept/lasing opportunities reported in the schedule, and mathematical metrics may be used to check if the target timelines are correct (given the target states that are already known from previous messages and data fusion results). In S911, mean square error between the reported schedule and the lo-fi model results may be used as the correctness checking metric. The check Lo-fi Physics S909 and the check schedule timeline S911 take as inputs the trusted existing messages and new messages. In an embodiment, the check Lo-fi Physics S909 and the check schedule timeline S911 may output a Boolean indicating that a check was passed. In such case, both Booleans must be true (YES in S913) for the message to be accepted. As such, the scheduler proof of work method provides proof of work and proof of loyalty while simultaneously solving the collective scheduling problem.

Once block history and proof of work are validated (YES in S913), in S919, data fusion element 323 can perform data fusion that provides robustness against noise and measurement error. In S917, data fusion may involve obtaining previous target state data from previous messages 915. In S921, results of data fusion may be broadcast to the network. Additionally, the validated schedule solutions may be stored in the blockchain database 450 for later use.

Figure 10:
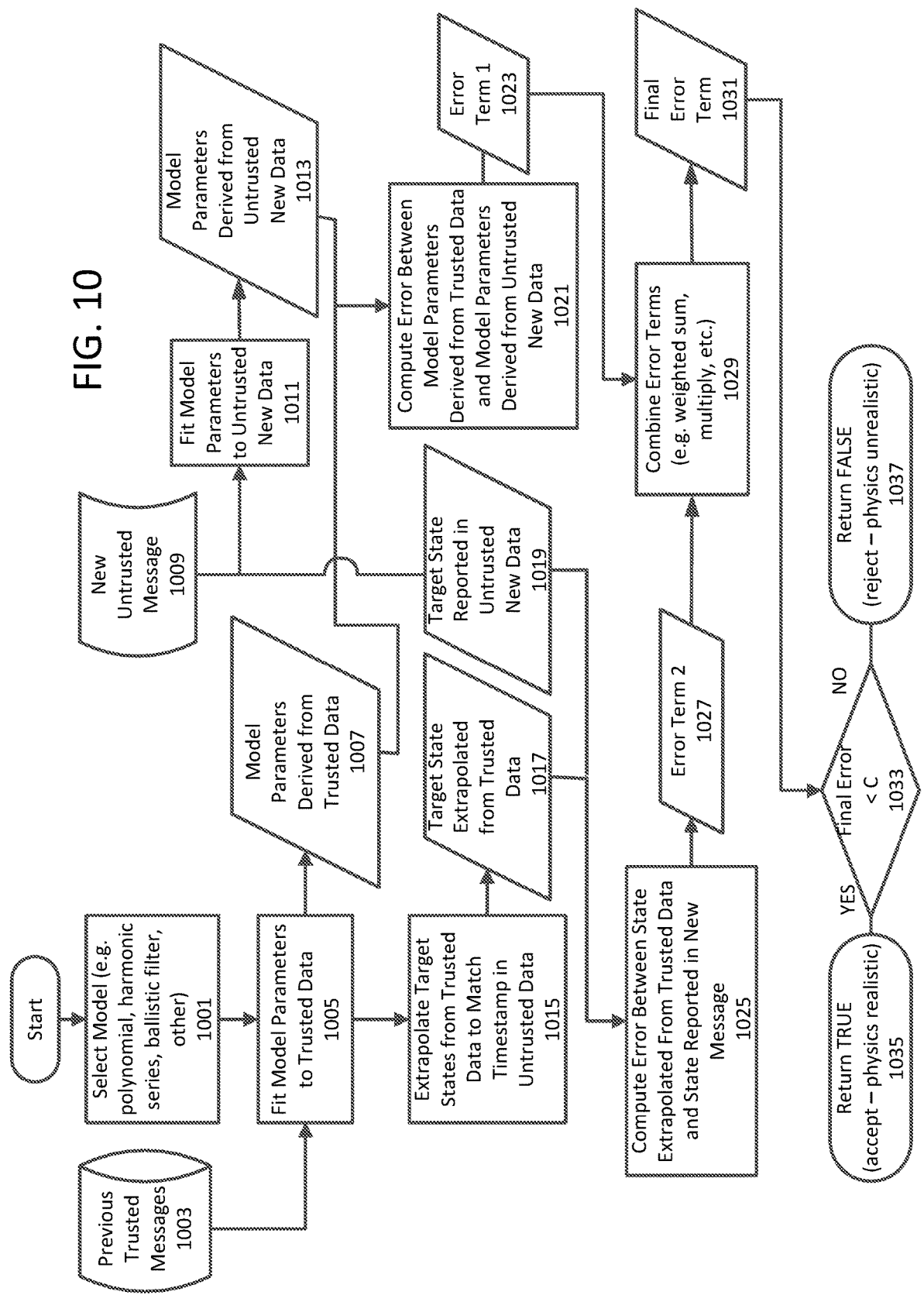
FIG. 10 is a flowchart for a physics checker in accordance with exemplary aspects of the disclosure.

FIG. 10 is a flowchart for a checker for the Lo-fi physics check S909 in accordance with exemplary aspects of the disclosure. The Lo-fi physics check may evaluate a new untrusted message 1009 based on previous trusted messages 1003. In 1005, a mathematical function may be fit to the existing trusted target state data of the previous trusted messages 1003 (i.e., data 1003 that has already been added to the common blockchain). Examples of mathematical functions include polynomials, harmonic series, or other functions that would allow extrapolation of future target states. Knowledge of target type may dictate which kind of mathematical function(s) may be used to extrapolate target states (e.g., a UAV may be fit to a different function than a ballistic object).

In 1001, knowledge of target type may dictate the selection of a physics model for that target. A physics model is defined to be a set of equations or calculation procedures whose parameters may vary as a function of collected target state data for a physical object; e.g., aircraft equations of motion. When a node receives a new block, new untrusted message 1009, for potential addition to the chain, in 1007, the node may compute physics model and/or mathematical function parameters using the trusted data; then, in 1011, re-compute the physics model and/or mathematical function parameters incorporating the data of the new untrusted message 1009 to derive model parameters 1013.

In another process, in 1015, target states may be extrapolated from trusted data to match the timestamp in untrusted data 1015 to obtain extrapolated target state data 1017. In 1021, a mean square error is calculated between model parameter derived from trusted data and model parameters derived from untrusted new data to obtain an error term 1023. Furthermore, in 1025, the new target state data 1019 may be compared against the data 1017 extrapolated from the trusted target state data 1017 to obtain an error term 1027. In 1029, error terms 1023 and 1027 may be combined, such as by summing the terms, a weighted sum of the terms, multiplying the error terms, to name a few, to obtain a final error term 1031. If the final error term 1031 exceeds a threshold (NO in 1033), then the new target state data 1019 will be rejected and the Lo-fi physics check would return FALSE 1037. For example, if trusted target state data indicates a vehicle having a certain position, and the new target state data indicates that the vehicle would have traveled an unrealistic distance in the given amount of time, the mean square error between the extrapolated state and the new state would be large and the new target state data would be rejected. Otherwise (YES in 1033), the Lo-fi physics check would return TRUE 1035.

Figure 11:
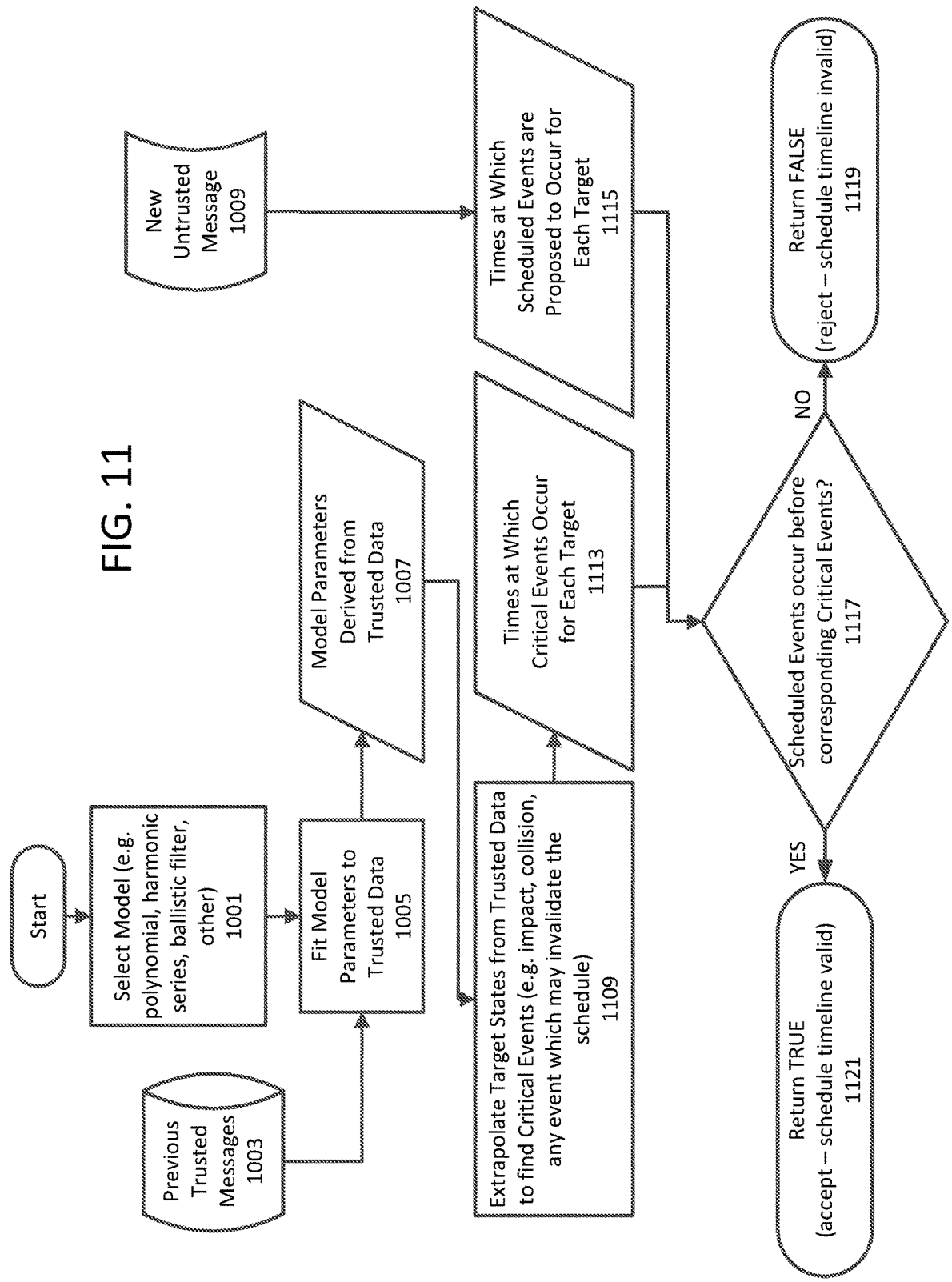
FIG. 11 is a flowchart for a schedule timeline checker in accordance with exemplary aspects of the disclosure.

FIG. 11 is a flowchart for a checker for a schedule timeline in accordance with exemplary aspects of the disclosure. The schedule timeline checker S911 performs a check to determine if the target timeline is valid. As with the check of Lo-fi physics, the check of the schedule timeline may evaluate a new untrusted message 1009 based on previous trusted messages 1003. Times at which scheduled events are proposed to occur for each target 1115 are extracted from the new untrusted message 1009.

In 1005, a mathematical function, for a model selected in 1001, may be fit to the existing trusted target state data of the previous trusted messages 1003 to derive model parameters 1007. In 1109, target states may be extrapolated from trusted data to find critical events, for example, impact, collision, or any event which may invalidate the schedule. The extrapolation provides times at which critical events occur for each target 1113.

In 1117, the times at which scheduled events are proposed to occur 1115 and compared to the times at which critical events occur for each target 1113. If the scheduled events occur before corresponding critical events (YES in 1117), in 1121 the check of the schedule timeline returns TRUE. Otherwise (NO in 1117), in 1119 the check of the schedule timeline returns FALSE. As mentioned above, in S913, both the check of Lo-fi physics S909 and the check of the schedule timeline S911 must be TRUE for a schedule to be accepted.

Example Implementations

Multiple advanced allied forces may be combined to face off against advanced adversarial forces. For example, a combat theatre may span land, sea, air, space, and cyber domains. The allied forces may include the following assets:
Land-based and shipboard artillery, lasers, and missiles
Multiple swarms of drones, possibly both armed drones and reconnaissance drones
Land-based and shipboard sensors, possibly including several types of radar, infrared, cameras etc.
Space based satellites for communication and reconnaissance
Communication links allowing cooperation and data sharing Such a diverse array of assets and the potential to cooperatively use those assets stands to provide tremendous advantages; especially because cooperative use facilitates engagement of the increasingly complex and imaginative threats of the future.

Once tracks on potential targets have been established on a threat complex, an engagement schedule must be chosen to engage the threats. As threats continue to increase in multitude, the computational difficulty in solving the engagement schedule problem is compounded.

Engagement scheduling and coordination of assets may be performed by a combat system scheduler that solves for a best schedule to engage targets given available resources. An example combat system scheduler may schedule engagement of targets with weapon platforms such as laser platforms and missile platforms. The example scheduler takes in a space of inputs and solves for some set of times at which critical events in the battle should occur. An optimum schedule is some schedule that optimizes a cost function to be less than a certain cost. In the case of the scheduler proof of work generator in FIG. 6, a schedule that optimizes a cost function is one that the final cost 641 is less than a threshold cost C (YES in 643).

For example, a cost function for a laser weapon system may be a function which gives weight to an orthogonal shot to the target, where the target is moving with respect to the laser platform. In particular, the cost function may have an objective of firing the laser at a time when the angle between the laser and the target surface is equal to 90 degrees. This objective is required to maximize the amount of power delivered to the smallest possible surface area. The cost function may take the form of a curve, where a solution is a point on that curve at which that power is maximum.

Another cost function for a laser weapon system may be, for example, a function that gives weight to a laser in which the longest part of the beam is going through the thinnest part of the atmosphere in order to prevent loss of power through the atmosphere. This cost function takes into account that the target is moving through the atmosphere and the density of the atmosphere varies with respect to altitude. Provided such cost function, an optimum schedule is one which the cost is minimum when the laser goes up through the thinner part of the atmosphere as opposed to a lower elevation shot through a thicker part of the atmosphere.

An example cost function for a missile scheduler may be, for example, a function that assigns a lower cost to solutions which give a low probability of a lagging missile seeking on its friend, a leading missile, when both are engaging on two different target missiles, when shooting multiple missiles at multiple targets. This and other terms of a cost function may be multiplied or added together and the schedule with the lowest cost is taken.

Cost functions may include soft constraints as well as hard constraints 623. An example soft constraint may be a constraint that the laser hits the target at a 90 degree angle. It is preferable to get as close as possible to a 90 degree angle. An example of a hard constraint is a laser direction that does not point in a direction of the sun. If the angle between the laser direction and the platform goes below a certain value such that the laser is pointing too close to the sun, the solution must be completely eliminated. That angle is a hard constraint because pointing the laser turret within that angle of the solar position would result in damage to the optics of the laser turret.

In some embodiments, the nodes solve portions of a single scheduling problem. There is one cost function which would define the cost of the schedule problem as a whole, so that cost function would include every event. For example, platforms involved in a combat space may include a missile platform and a laser platform, e.g., two missile platforms and one laser platform:

One missile platform may shoot a missile, which is one event. Then the second platform is going to shoot a second missile, which is a second event. Then when the laser is going to start firing and when the laser is going to stop firing, are events number three and four.

In such case, the schedule is a four dimensional space and the goal is to find the point in that four dimensional space that gives the best cost. Each of those platforms would be initialized at a random point in that four dimensional space so as they proceed the steepest descent down the cost hypersurface they are excavating different portions of the same cost function.

A user of the system may input a cost function. In different combat systems, some platforms will include laser weapon systems, some platforms are going to have both a laser and a kinetic weapon. In such case, they all may have different cost functions associated with them.

For example, the cost function for a laser weapon system would be a function which would weight an orthogonal shot to the target, the target is moving with respect to the laser platform and an object is to fire at a time when the angle between the laser and the target surface is equal to 90 degrees, so as to maximize the amount of the largest amount of power and smallest possible surface area. The cost function may be a curve and a solution is to find the point on that curve at which that power is maximized.

Another cost function for a laser weapon may be, for example, as the target is moving it is going through the atmosphere and the density of the atmosphere varies with respect to altitude. The laser should be shot such that the longest part of the beam is going through the thinnest part of the atmosphere so as not to lose power through the atmosphere and to therefore impose desired effect on the target in the quickest possible way. The cost function may be one which assigns a lower cost to schedules which would result in the laser going up through the thinner part of the atmosphere, as opposed to a lower elevation shot through a thicker part of the atmosphere.

Another example may be a missile platform shooting multiple missiles at multiple targets. The cost function may be one that assigns a lower cost to solutions which give a low probability of a lagging missile seeking on a friend, a leading missile, when both are supposed to be engaging two different target missiles. The optimal schedule may be one in which this term when multiplied or added with other constraint terms is the schedule with the lowest cost.

Figure 12:
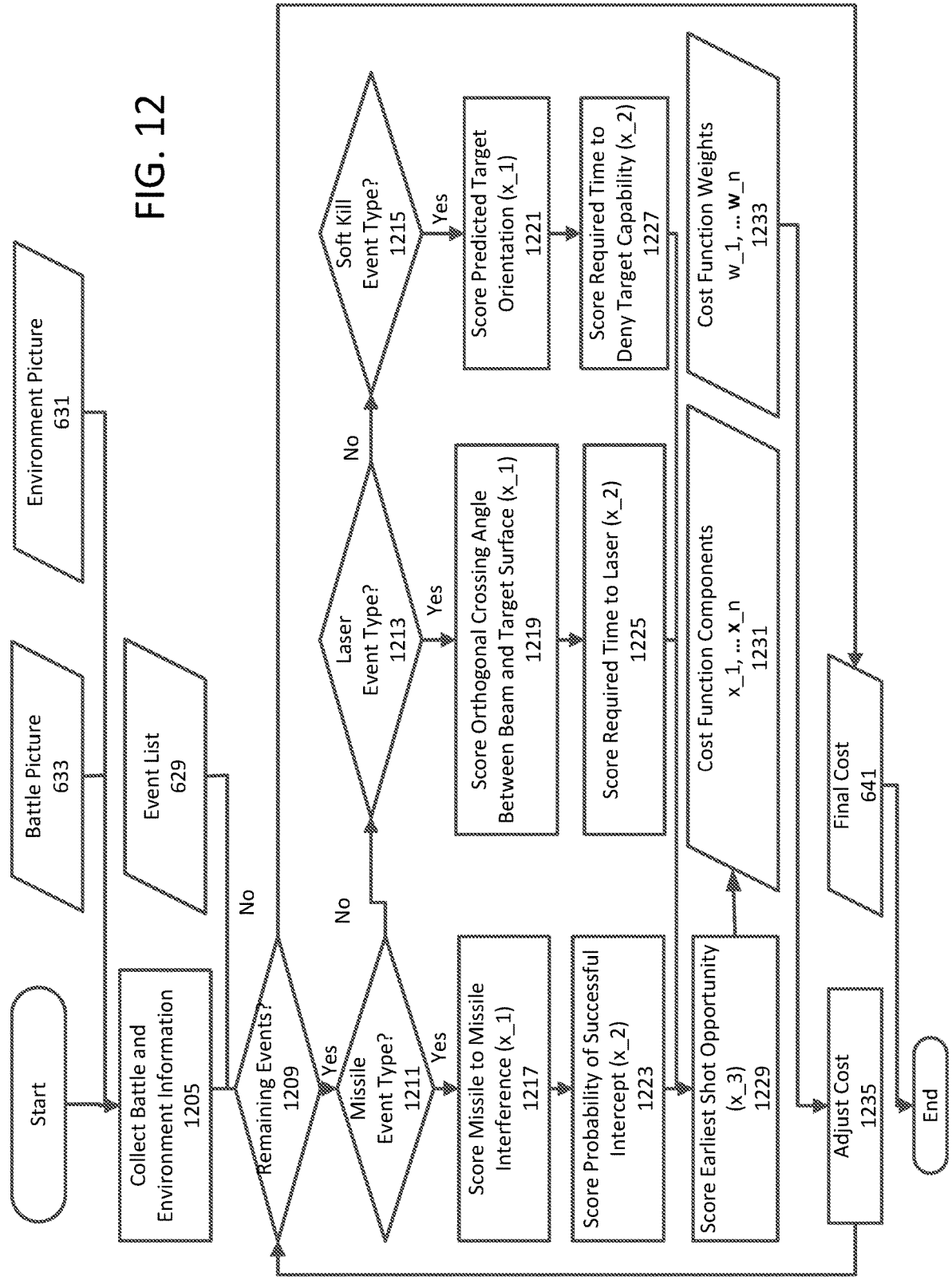
FIG. 12 is a flowchart for an exemplary schedule evaluator in accordance with exemplary aspects of the disclosure.

In some embodiments, in order to determine the cost 641 of a schedule, a schedule (in the form of an optimized event list 629) may be evaluated by the Schedule Evaluator 640. The Schedule Evaluator 640 is dependent on the specific type of events in the Optimized Event List 629. FIG. 12 is a flowchart for an exemplary schedule evaluator 640 for a combat engagement schedule. The picture data 633 may be for a battle picture. The environment picture data 631 may be for a combat environment. In some embodiments, the battle picture data and the environment data may be read by a collector 1205. The schedule evaluator 640 may determine cost by iterating over events in the event list 629 until the end of the event list is reached (NO in 1209).

In the case of a combat engagement schedule, events may include a missile event, laser event, soft kill event, and any other type of event depending on targets or weapons that may be within the capabilities of combat system nodes.

In the case of a missile event type (1211), in 1217, a Missile To Missile Interference Score is determined which will be lower for missile shots which have a higher probability of interfering with other allied missile shots and higher for missile shots which have a lower probability of interfering with other allied missile shots.

In 1223, a Probability Of Successful Intercept Score is determined, which can, for example, be computed as a function of predicted/extrapolated target kinematics. If the target is expected to execute a high acceleration maneuver, Probability Of Successful Intercept Score will be lower for missile shots expected to have an intercept time during the high acceleration maneuver.

In the case of a laser event type (1213), in 1219, an Orthogonal Crossing Angle Score is determined, which will be lower for laser engagements that will occur at a time such that the angle between the beam and the target surface will be non-orthogonal. Conversely, the Orthogonal Crossing Angle Score will be higher for laser engagements that will occur at a time such that the beam is orthogonal to the target surface.

In 1225, depending on atmospheric conditions, target type, target position, target orientation, and other factors, the amount of time required for a laser to defeat a target will vary. The expected required time to lase a target may be computed as a function of these factors. Short expected lase times will result in a high Required Time To Laser Score. Conversely, long expected required laser times will result in a lower Required Time To Laser Score.

In the case of a soft kill event type (1215), in 1221, a Predicted Target Orientation Score is determined, which will be higher for target orientations facilitating the desired type of soft-kill. For example, if the mission is to use a laser to degrade a sensor on the target, target orientations which expose the sensor to the given weapons platform will result in higher Target Orientation Scores.

Often the time required to use a laser to degrade a sensor on a target is less than the time required to destroy the target. Still, as is the case with destroying a target with a laser, the expected time required to achieve the desired effect on the target will be affected by atmospheric conditions, target type, target position, target orientation, and other factors. In 1227, short expected laser times required to degrade a target sensor are determined, which will result in a high Required Time To Laser Score. Conversely, long expected laser times required to degrade a target sensor will result in a lower Required Time To Lase Score.

In 1229, an Earliest Shot Opportunity score may be computed to supplement the scores computed in 1223, 1225, and 1227. The Earliest Shot Opportunity score may be applicable to any of the event types. Early shot opportunities result in higher Earliest Shot Opportunity Scores while later shot opportunities result in lower Earliest Shot Opportunity Scores such that waiting too long to take a shot is penalized. In 1231, the cost function components for each event are determined. In 1233, weighted sums of components may be evaluated. Cost function weights may include constraints, may be scenario dependent, or may be computed adaptively based on targets and/or weapons. For example, scenarios with mixed UAV and mortar targets may demand different weights than exclusively UAV target scenarios.

In 1235, the cost is adjusted for the scored event. After the Cost Function Components for each event are computed, they may be incorporated into a total Final Cost 641 for a given Event List using a number of well-known formulae. Examples include weighted sums of components, multiples of components, multiples of sigmoidal functions of components, to name a few.

In addition, different assets have different characteristics that may be considered in performing engagement scheduling. For example, while missiles can intercept a threat at a discrete engagement opportunity, lasers can continuously engage a threat over a variable interval of time. Additionally, cyber/electronic warfare places new schedule constraints on when and where a threat may be reliably engaged.

A particular challenge in combat system scheduling is trust, both in distinguishing messages from allied participants from enemy forgeries, and in distinguishing enemy participants from allied participants. For example, a radar of a base system may be reporting the position data of several enemy drones, and an incoming adversary missile, but the data is unreliable due to enemy jamming. An ally's shipboard radar is picking up the enemy missile but is having trouble establishing a firm track. An enemy is also sending forged track messages, using an electronic system reverse engineered from a compromised land-based vehicle. So, it is unclear which messages to trust.

In another example, the enemy drones are broadcasting both the jamming signal and the forged track data. An allied shipboard laser is in position to engage the enemy drone swarm, but it is waiting on messages from the base system detailing the positions of drones launched from the base system (which are currently uploading the coordinates of the land-based missile launch site to an external allied base that can plan a counter strike). There are only a few seconds left until missile impact. Enemy drones are intelligently flying in and out of a solar exclusion cone to deliberately confuse allied infrared sensors.

The engagement scheduler 315 must determine who should engage what first; who can be trusted; what is the heading of the shipboard radar. The engagement scheduler 315 must determine which messages can be trusted and distinguish them from enemy forgeries, and whether the ship's track can be fused with the base system.

Using engagement scheduling as proof of work, the blockchain of target state messages is hardened against one of the only attacks that can threaten a blockchain's integrity. The only way to forge a block (without controlling more than half a blockchain network) is to forge all previous blocks in the chain. But, such forgery (already difficult) is made virtually impossible by requiring POW with each block. Subsequently, the blockchain system uses the valuable act of foreseeing the adversary's next move as POW.

Using engagement scheduling as POW is a strategically secure method of differentiating friend vs. foe/authentic vs. forged messages. With the blockchain system, submitting a valid portion of the engagement schedule solution is a pre-requisite for submitting a message. If an adversary forges a message, the adversary is required to submit a plausible solution to the engagement schedule that would facilitate their own demise. This leaves an adversary forger with two options: try to forge a valid message and waste time scheduling verifiably realistic engagements against their own targets (YES in S905 of FIG. 9) or (b) waste time forging an invalid message that will be immediately rejected (NO in S905 of FIG. 9).

Aspects include use of scheduling problems as proof of work in a blockchain system, application of a blockchain system to synchronize target state measurements/results propagation, a specific blockchain Conflict Resolution System, a specific distributed schedule solving algorithm, and the use of a strategically chosen proof of work problem that also provides "proof of loyalty."

Numerous modifications and variations of the present disclosure are possible in light of the above teachings. It is therefore to be understood that within the scope of the appended claims, the disclosure may be practiced otherwise than as specifically described herein.

The present disclosure is applicable in any system with a need to securely fuse and synchronize records of measured kinematic state information while solving a distributed scheduling problem. A variation of the present disclosure includes self-driving cars that must communicate measured kinematic state information with each other while solving distributed collision avoidance algorithms all while remaining robust to network errors, malicious civilian adversaries, and other network risks.

Autonomous vehicles can rely on trained neural networks to do pattern recognition and object filtering from the variety of LIDAR and optical sensors attached. Multiple independent AI agents operating vehicles will need to distribute their observable data to create a unified road-picture. A local network of cars may share personal kinematic and intent, as well as observed environment data. The valuable proof of work may be a continuous evaluation of spatial availability for each autonomous vehicle in the roadway. For example, an autonomous vehicle is attempting to merge onto a busy highway. The current speed and location of that vehicle are available to the other vehicles via their own sensors.

The merging vehicle also broadcasts the current kinematics as well as intention (future/planned kinematics). Other vehicles in the local network would be able to validate the plausibility of the reported location and speed. Additionally, they would validate the plausibility of the proposed merge. To accommodate a merge, an alternative vehicle may need to slow its intended speed. This is also broadcast to other cars sharing the local blockchain. At each communication, all intended vectors are verified to prevent collisions or maneuvers endeavored too risky.

Another variation includes swarms of commercial drones that must share kinematic state information to coordinate flight paths while solving a distributed scheduling problem (e.g., for product delivery). In this example system, engagement scheduling algorithms are replaced with optimized route scheduling. The proof of work output would continually improve on a hyperplane outlining efficient management of delivery routes which takes into consideration: throughput of a distribution center, flight duration/distance, recharge times for individual drones, flight path control, etc. The ultimate objective being to solve towards the optimum delivery coordination effort of the drone swarm. The characteristics of this meet the valuable proof of work/proof of loyalty criteria. Conflict resolution would be handled in the same way.

Another variation includes networks of commercial satellites that must share kinematic state information with each other while scheduling communications, weather monitoring services, or other missions with commercial value. For example, it may be desirable for satellites to coordinate the use of onboard cameras such that the largest possible percentage of a predefined surveillance zone is imaged as frequently as possible by the satellite cameras with the best possible view of the zone. Determining which satellite should survey which portion of the surveillance zone and when requires solving a distributed cost function. Collaboratively fusing the images (e.g., with image stitching) from each camera reliably and using the results requires maintaining a secure common database of images. Here optimum or near optimum solutions to this cost function may be used as proof of work to secure a blockchain database which stores the surveillance images. As such, a common image of the entire surveillance zone will be maintained, and the network of satellites will be able to autonomously determine where and when each satellite should capture an image.

The invention claimed is:

1. A system comprising:
   a computing system, having one or more processors coupled with memory, configured to:
   maintain a secured chain of linked messages for an object, each message of the linked messages including: (i) a respective state of a plurality of states for the object, and (ii) and a respective portion of a schedule, the schedule defining a timeline for the plurality of states for the object;
   receive a first message to update a state of an object in the secured chain of linked messages;
   determine to link the updated state with the secured chain of linked messages;
   determine, responsive to the determination to link the updated stated with the secured chain of linked messages, as proof of work, a portion of the schedule for the updated state of the object based on the updated state of the object and the timeline of the schedule for the plurality of states for the object in the linked messages in the secured chain of linked messages;
   create a second message including (i) the updated state of the object and (ii) the determined portion of the schedule to link to the secured chain of linked messages;
   determine the portion of the schedule by evaluating a cost function beginning at an arbitrary start point;
   evaluate the cost function by finding a set of times that result in a cost below a threshold cost;
   encode the determined portion of the schedule;
   create the second message including the encoded portion of the schedule as the proof of work; and
   broadcast the second message as the secured chain of linked messages.

2. The system of claim 1, wherein the computing system is further configured to:
   determine to link the updated state of the object with the secured chain of linked messages by checking a length of a hash of the received first message; and
   validate the proof of work by checking the determined portion of the schedule against a physics model of a physical object corresponding to the object using an error metric.

3. The system of claim 2, wherein the computing system is further configured to:
   evaluate a plurality of the validated schedule portions against a predefined activation function of weighted schedule parameters.

4. The system of claim 1, wherein the computing system is further configured to:
   create the second message by determining a hash of the message and a previous message.

5. The system of claim 1, wherein the computing system is further configured to:
   encrypt the second message.

6. The system of claim 1, wherein the computing system is further configured to:
   determine the portion of the schedule beginning at the arbitrary start point by:
   obtaining a list of initial schedules;
   randomly selecting an initial schedule from the list of initial schedules; and
   perturbing parameters of the selected initial schedule until a local minimum of the cost function is reached.

7. The system of claim 1, wherein the computing system is further configured to:
   evaluate the cost function, which for given target states and engagement platform states, finds laser weapon start and stop times and missile intercept times that result in the cost below the threshold cost.

8. The system of claim 1, wherein the respective state of the object includes target state measurements and data fusion results from non-collocated sensors, and
   wherein the computing system receives the first message that includes a hash of linked previous messages in the secured chain of linked messages containing the target state measurements and the data fusion results and the determined schedule portion.

9. A method comprising:
   maintaining, by a computing system, a secured chain of linked messages for an object, each message of the linked messages including: (i) a respective state of a plurality of states for the object, and (ii) and a respective portion of a schedule, the schedule defining a timeline for the plurality of states for the object;
   receiving, by the computing system, a first message to update a state of an object in the secured chain of linked messages;
   determining, by the computing system, to link the updated state of the object should be linked into the secured chain of linked messages;
   determining, by the computing system, responsive to determining to link the updated stated with the secured chain of linked messages, as proof of work, a portion of the schedule for the updated state of the object based on the updated state of the object and the timeline of the schedule for the plurality of states for the object in the linked messages in the secured chain of linked messages, wherein the determining the portion of the schedule includes evaluating a cost function beginning at an arbitrary start point, and wherein the evaluating of the cost function includes finding a set of times that result in a cost below a threshold cost;
   encoding, by the computing system, the determined portion of the schedule;

creating, by the computing system, a second message including (i) the updated state of the object and (ii) the encoded portion of the schedule as the proof of work to link to the secured chain of linked messages; and broadcasting, by the computing system, the second message as the secured chain of linked messages.

10. The method of claim 9, further comprising:

determining, by the computing system, to link the updated state of the object with the secured chain of linked messages by checking a length of a hash of the received first message, and validating, by the computing system, the proof of work by checking the determined portion of the schedule against a physics model of a physical object corresponding to the object using an error metric.

11. The method of claim 10, further comprising evaluating, by the computing system, a plurality of the validated schedule portions against a predefined activation function of weighted schedule parameters.

12. The method of claim 9, wherein the creating the second message includes determining a hash of the message and a previous message.

13. The method of claim 9, further comprising:

encrypting, by the computing system, the second message.

14. The method of claim 9, wherein the determining the portion of the schedule beginning at the arbitrary start point is by:

obtaining a list of initial schedules;

randomly selecting an initial schedule from the list of initial schedules; and perturbing parameters of the selected initial schedule until a local minimum of the cost function is reached.

15. The method of claim 9, further comprising evaluating, by the computing system, the cost function, which for given target states and engagement platform states, finds laser weapon start and stop times and missile intercept times that result in the cost below the threshold cost.

16. The method of claim 9, wherein the respective state of the object includes target state measurements and data fusion results from non-collocated sensors, and wherein the receiving the first message related to updated state of the object includes receiving a hash of linked previous messages in the secured chain of linked messages containing the target state measurements and the data fusion results and the determined schedule portion.

* * * * *